United States Patent
Forrest et al.

(10) Patent No.: US 9,463,441 B2
(45) Date of Patent: Oct. 11, 2016

(54) CATALYST PREPARATION METHOD

(75) Inventors: Sebastian John Kipling Forrest, Amersham (GB); Jonathan Geoffrey Oliver, Gilesgate (GB); Samuel Arthur French, Neasham (GB); Mikael Per Uno Carlsson, Stockton on Tees (GB)

(73) Assignee: Johnson Matthey PLC, London (GB)

( * ) Notice: Subject to any disclaimer, the term of this patent is extended or adjusted under 35 U.S.C. 154(b) by 572 days.

(21) Appl. No.: 13/881,933

(22) PCT Filed: Oct. 4, 2011

(86) PCT No.: PCT/GB2011/051889
§ 371 (c)(1),
(2), (4) Date: Jul. 15, 2013

(87) PCT Pub. No.: WO2012/056211
PCT Pub. Date: May 3, 2012

(65) Prior Publication Data
US 2013/0281289 A1    Oct. 24, 2013

(30) Foreign Application Priority Data
Oct. 27, 2010  (GB) .................................. 1018152.7

(51) Int. Cl.
*B01J 23/58* (2006.01)
*B01J 23/78* (2006.01)
(Continued)

(52) U.S. Cl.
CPC ............... *B01J 23/78* (2013.01); *B01J 21/005* (2013.01); *B01J 21/02* (2013.01); *B01J 23/005* (2013.01);
(Continued)

(58) Field of Classification Search
CPC ........ B01J 23/78; B01J 37/18; B01J 23/005; B01J 37/0205; B01J 21/005; B01J 35/008; B01J 23/755; B01J 37/0203; B01J 21/02; C01B 3/40; C01B 3/586; C01B 2203/0445; C01B 2203/0233; C01B 2203/1058; C01B 2203/0238
USPC .................................................. 502/308, 328
See application file for complete search history.

(56) References Cited

U.S. PATENT DOCUMENTS

| 4,090,980 A | 5/1978 | Carter et al. |
| 4,380,589 A * | 4/1983 | Murchison ........... B01J 23/8872 502/306 |

(Continued)

FOREIGN PATENT DOCUMENTS

| WO | WO-2004/014549 A1 | 2/2004 |
| WO | WO-2010/029323 A1 | 3/2010 |

(Continued)

OTHER PUBLICATIONS

Ekaterini Ch. Vagia, Angeliki A. Lemonidou, "Hydrogen production via steam reforming of bio-oil components over calcium aluminate supported nickel and noble metal catalysts", Applied Catalysis A: General vol. 351, Issue 1, Dec. 15, 2008, pp. 111-121.*

(Continued)

*Primary Examiner* — Colleen Dunn
*Assistant Examiner* — Haytham Soliman
(74) *Attorney, Agent, or Firm* — RatnerPrestia

(57) ABSTRACT

A method is described for preparing a catalyst including the steps of:
(i) impregnating a calcined support comprising a metal aluminate with a solution of nickel acetate at a temperature ≥40° C. and drying the impregnated support,
(ii) calcining the dried impregnated support, to form nickel oxide on the surface of the support and
(iii) optionally repeating steps (i) and (ii) on the nickel oxide coated support.

The method provides an eggshell catalyst in which the metal oxide is concentrated in an outer layer on the support.

15 Claims, 1 Drawing Sheet

(51) Int. Cl.
*B01J 21/00* (2006.01)
*B01J 21/02* (2006.01)
*B01J 23/00* (2006.01)
*B01J 23/755* (2006.01)
*B01J 35/00* (2006.01)
*B01J 37/02* (2006.01)
*B01J 37/18* (2006.01)
*C01B 3/40* (2006.01)
*C01B 3/58* (2006.01)

(52) U.S. Cl.
CPC ............ *B01J 23/755* (2013.01); *B01J 35/008* (2013.01); *B01J 37/0203* (2013.01); *B01J 37/0205* (2013.01); *B01J 37/18* (2013.01); *C01B 3/40* (2013.01); *C01B 3/586* (2013.01); *C01B 2203/0233* (2013.01); *C01B 2203/0238* (2013.01); *C01B 2203/047* (2013.01); *C01B 2203/0445* (2013.01); *C01B 2203/1058* (2013.01); *C01B 2203/1082* (2013.01)

(56) References Cited

U.S. PATENT DOCUMENTS 4,707,351 A 11/1987 Lord et al.
2008/0032887 A1 2/2008 Ratnasamy et al.

FOREIGN PATENT DOCUMENTS

WO WO-2010/029324 A1 3/2010
WO WO-2010/125369 A2 11/2010

OTHER PUBLICATIONS

Office Action for Chinese Patent Application No. 201180052096.0, mailed Jul. 1, 2014.
Song et al., Industrial Catalysis, 12(8):46-49.
International Preliminary Report on Patentability dated Apr. 30, 2013, from PCT International App. No. PCT/GB2011/051889.
International Search Report dated Feb. 8, 2012, from PCT International Application No. PCT/GB2011/051889.

* cited by examiner

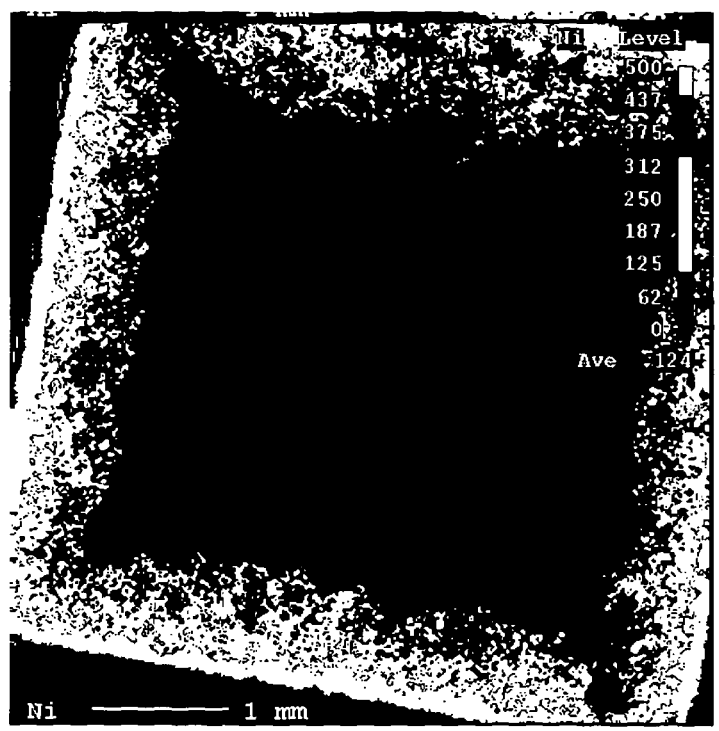

CATALYST PREPARATION METHOD

CROSS-REFERENCE TO RELATED APPLICATIONS

This application is the U.S. National Phase application of PCT International Application No. PCT/GB2011/051889, filed Oct. 4, 2011, and claims priority of British Patent Application No. 1018152.7, filed Oct. 27, 2010, the disclosures of both of which are incorporated herein by reference in their entireties for all purposes.

BACKGROUND OF THE INVENTION

This invention relates to a method of preparing catalysts supported on metal aluminate supports.

Metal aluminate-supported catalysts are used in a number of industrial processes, including methanation and steam reforming processes, such as pre-reforming, primary reforming and secondary reforming. In such cases the catalytically-active metal is typically nickel, but other transition metals or precious metals, may also be used.

In methanation and steam reforming processes, pellets comprising nickel oxide on alumina or calcium aluminate are typically installed and the reduction of the nickel oxide to the active elemental nickel carried out in situ.

U.S. Pat. No. 4,707,351 describes steam-reforming catalysts made of a low-silica calcium aluminate cement composition in a saddle configuration. The catalysts were prepared by mixing calcium aluminate with water and polyvinylacetate, stamping shapes from the resulting material, drying and calcining the saddles at up to 1400° C. before impregnation with nickel nitrate. The impregnated saddles were further dried and calcined to generate the catalyst precursor. In this process, the calcium aluminate support was hydrated during the shaping process and then calcined to increase its strength and define the micromimetric properties prior to impregnation with nickel nitrate.

Heretofore it has been seen as necessary to impregnate supports to achieve a uniform dispersion of the nickel compound within the pellets such that upon calcination the metal oxide is uniformly dispersed within the pellet, thereby maximising the metal surface area and hence catalyst activity.

SUMMARY OF THE INVENTION

Applicants have found that by using aqueous solutions of nickel acetate at elevated temperatures, an egg-shell catalyst precursor may be produced in which the metal oxide formed upon calcination is concentrated as an outer surface layer on the metal aluminate support and is not uniformly distributed. Moreover, the properties of such catalysts are enhanced in comparison to the known catalysts.

Accordingly, the invention provides a method for preparing a catalyst comprising the steps of:
(i) impregnating a calcined support comprising a metal aluminate with a solution comprising nickel acetate at a temperature ≥40° C. and drying the impregnated support,
(ii) calcining the dried impregnated support, to form nickel oxide on the surface of the support and
(iii) optionally repeating steps (i) and (ii) on the nickel oxide coated support.

The invention further provides an eggshell catalyst obtainable by the method.

The invention further provides a process for the steam reforming of hydrocarbons comprising the step of contacting a mixture of hydrocarbon and steam at elevated temperature and pressure with the eggshell catalyst.

BRIEF DESCRIPTION OF THE DRAWING

FIG. 1 is an EPMA image of a cross-section of a cylindrical catalyst pellet prepared according to the present invention depicting an eggshell layer of nickel oxide.

DETAILED DESCRIPTION OF THE INVENTION

By the term "eggshell catalyst" we mean that the catalytically active metal or metals are not uniformly distributed within the catalyst support but are concentrated at the surface and therefore form a thin layer, with the metal or metals being absent beneath this layer. The thickness of the eggshell layer is preferably ≤1000 μm, more preferably ≤800 μm, most preferably ≤300 μm. The thickness of the layer may readily be established using electron probe microanalysis (EPMA) or optical microscopy on cross-sectioned catalysts.

The catalyst support comprises a metal aluminate. The metal aluminate may be a Group II aluminate such as magnesium aluminate or calcium aluminate, and/or may comprise a transition metal aluminate such as nickel aluminate. The support has been calcined, i.e. subjected to a heating step to alter its physiochemical properties. The calcined support is impregnated with the solution of nickel acetate.

The catalyst support is preferably prepared from a calcium aluminate cement. By the term calcium aluminate cement we include those hydraulic cements containing one or more calcium aluminate compounds of the formula $nCaO \cdot mAl_2O_3$ where n and m are integers. Example of such calcium aluminate compounds include calcium monoaluminate ($CaO \cdot Al_2O_3$), tricalcium aluminate ($3CaO \cdot Al_2O_3$), penta calcium trialuminate ($5CaO \cdot 3Al_2O_3$), tricalcium penta aluminate ($3CaO \cdot 5Al_2O_3$), and dodeca calcium hepta aluminate ($12CaO \cdot 7Al_2O_3$). Some calcium aluminate cements, e.g. the so-called "high alumina" cements, may contain alumina in admixture with, dissolved in, or combined with, such calcium aluminate compounds. For example, a well known commercial high alumina cement has a composition corresponding to about 18% calcium oxide, 79% alumina and 3% water and other oxides. This material has a calcium:aluminium atomic ratio of about 1:5, i.e. $2CaO \cdot 5Al_2O_3$. Calcium aluminates are often contaminated with iron compounds, but these are not believed to be detrimental to the present invention. Suitable cements include the commercially available Ciment Fondu, and Secar 50, Secar 71, Secar 80 available from Kerneos and CA-25, CA-14, CA-270 available from Almatis.

The support composition employed in the present invention preferably has a calcium:aluminium atomic ratio within the range 1:3 to 1:12, more preferably 1:3 to 1:10, most preferably 1:4 to 1:8. Where the calcium aluminate cement is a "high alumina" cement, no additional alumina may be necessary but, in general, the support is desirably made from a calcium aluminate cement to which an additional amount of alumina, which may be in the form of a transition alumina, monohydrate or trihydrate, has been added.

To accelerate setting, an amount of lime (CaO), e.g. up to 15% by weight of the composition, may also be incorporated into the support composition.

Hence the support preferably comprises a refractory composition consisting of a calcined mixture of alumina, one or more of said calcium aluminate compounds and optionally lime.

Other oxidic materials, e.g. titania, zirconia or lanthana, may be present in the support composition. While silica may in some cases be incorporated, for use as a steam reforming support, a low silica content, i.e. less than 1% by weight, preferably less than 0.5% by weight, based on the weight of the oxidic material in the support composition is desirable, as silica has an appreciable volatility under steam reforming conditions. The support composition preferably contains ≤25% by weight, more preferably ≤15% by weight, most preferably ≤10% by weight of oxidic material other than alumina or metal aluminate.

The shaped catalyst support may be made by forming a calcium aluminate cement powder, optionally with additional alumina and/or lime, into the desired shape, curing the cement and subsequently calcining the shaped support.

Processing aids, such as graphite and/or a metal stearate (e.g. Mg or Al stearate), may be incorporated into the composition prior to shaping. Typically the proportion of graphite is 1 to 5% by weight of the composition. The amounts of metal stearate included may be in the range 0.1 to 2.0% by weight.

A typical composition suitable for pellet formation comprises 30 to 70% by weight of a calcium aluminate cement (comprising 65 to 85% by weight of alumina and 15 to 35% by weight of CaO) mixed with 24 to 48% by weight of alumina, 0 to 15% by weight of lime, and 2 to 5% by weight of graphite.

The composition is desirably shaped into pellets using known techniques, but may also be prepared as extrudates or granules. The length, width and height of such shaped units may be in the range 3-50 mm. The support may be in the form of saddles as described in the aforesaid U.S. Pat. No. 4,707,351 but preferably the support is pressed into pellets in the form of cylinders, which may have one or more through holes, for example as described in WO 2004/014549. More preferably the shaped support is in the form of a cylindrical pellet having between 1 and 12 holes extending there-through, especially 3-10 holes e.g. of circular cross section, and optionally between 2 and 20 flutes or lobes running along the length of the pellet. Suitable diameters for such pellets are in the range 4-40 mm and the aspect ratio (length/diameter) is preferably ≤2. A particularly preferred shape is a highly domed cylindrical pellet in the form of a cylinder having a length C and diameter D, which has one or more holes extending therethrough, wherein the cylinder has domed ends of lengths A and B, such that (A+B+C)/D is in the range 0.50 to 2.00, and (A+B)/C is in the range 0.40 to 5.00. Such shapes are described in WO 2010/029323 A1 and WO 2010/029324 A1. C is preferably in the range 1 to 25 mm and D is preferably in the range 4 to 40 mm.

After shaping, the cement in the shaped catalyst support should be cured and the support dried, typically at under 200° C., and then calcined. Curing of the calcium aluminate cement may take place before or during a drying step, e.g. by spraying or immersing the shaped catalyst support with water prior to drying or by heating the shaped catalyst support under conditions of controlled relative humidity prior to volatilising residual water. Calcination is typically carried out by heating the shaped units to between 400 and 1400° C. in air for between 1 and 16 hours. The catalyst support strength increases, while the porosity and surface area decrease, as the calcination temperature increases. Hence the support calcination should be effected at sufficient temperature to obtain the required mechanical strength but should not be so high that the surface area and porosity are unduly reduced.

The shaped calcined catalyst support preferably has a total surface area, as measured by nitrogen absorption, of 0.5 to 40 $m^2 g^{-1}$, particularly 1 to 15 $m^2 g^{-1}$, and a pore volume of 0.1 to 0.3 $cm^3.g^{-1}$, as determined by mercury porosimetry.

Prior to the final calcination, the support may be "alkalised" by impregnation with a solution of an alkali such as potassium hydroxide. This serves to minimise lay down of carbon on the catalyst during steam reforming. Alkali oxide, e.g. potash, levels of up to about 5% wt on the calcined support may be used.

The calcined catalyst support is then impregnated with a solution comprising nickel acetate $[Ni(OOCCH_3)_2]$, which may be provided as a hydrated salt. Preferably all the nickel is provided as nickel acetate. The impregnation solution may comprise one or more additional metal compounds, such as one or more transition metals, for example chromium, manganese cobalt, iron, copper or zinc, or lanthanides such as lanthanum or cerium.

Aqueous impregnation solutions are preferably used. Whereas organic solvents such as methanol, ethanol or acetone may be used or included in the aqueous solution, this is less preferred.

The concentration of nickel in the impregnating solution is desirably in the range 0.5-1.0M.

Impregnation should be performed at a temperature ≥40° C., preferably ≥50° C., more preferably ≥60° C., most preferably ≥70° C. A maximum temperature below boiling is desired. Impregnation may be performed at atmospheric or elevated pressure using known techniques, including immersion of the calcined catalyst support in a nickel acetate solution or by so-called "incipient wetness" impregnation where the volume of solution used equates approximately to the pore volume of the support material.

Following impregnation, the impregnated support is dried and calcined. The support drying is preferably performed at a temperature in the range 25-250° C., more preferably in the range 50-150° C. at atmospheric or reduced pressure. Drying times may be in the range 1-24 hours. The calcination step to convert the impregnated nickel acetate into nickel oxide is preferably performed at a temperature in the range 250-850° C. The calcination may be performed in air or an inert gas such as nitrogen. The drying and calcination may be performed in a single step. An advantage of the present invention, by virtue of the use of nickel acetate, the lower metal content and the increased metal concentration at the surface of the catalysts, is that the evolution of greenhouse gases during calcination, is minimised and in particular the emission of nitrogen oxides is eliminated, compared with current catalyst materials.

The catalytic metal content of the resulting catalyst may be determined by a number of factors such as the metal content of the solution and the impregnation conditions. Steam reforming catalysts formed by impregnation typically have a NiO content in the range 10-35% wt. Precipitated pre-reforming catalysts can have NiO contents of 40-80% wt or more. Methanation catalysts typically have a NiO content in the region of 30-35% wt. In the present invention, because the catalytic metal oxide is concentrated at the surface of the support it is possible to achieve improved catalyst activity with reduced metal loadings. This has clear commercial benefits. The catalytic metal oxide (NiO) content of the calcined catalyst is preferably in the range 2 to 25% wt, preferably 4 to 15% wt. Whereas one impregnation may be sufficient to generate the desired catalyst, preferably the impregnation, drying and/or calcining steps are repeated until the catalytic metal oxide content of the calcined material is ≥2.5% wt, preferably ≥3% wt, more preferably ≥4% wt. At these levels the concentration of Ni in the eggshell layer is preferably ≥10% wt.

The specific surface area of the catalytic metal (Ni) is suitably in the range 0.1 to 50 m²/g of catalyst. Within this range, larger areas are preferred for reactions under 600° C.

One or more promoter compounds may be impregnated into the dried support and/or the metal oxide coated support. Hence one or more promoter compounds may be included in the nickel acetate impregnating solution or the promoter may be added subsequently by a separate impregnation. The promoter may be confined to the eggshell layer or may be distributed throughout the catalyst support. Promoters include precious metals such as platinum, palladium, iridium, ruthenium, rhodium and gold. Lanthanide metals such as lanthanum and cerium may also be included as promoters. Water-soluble salts, particularly acetates, may be used as sources of the metal promoters. More than one promoter may be present and additional alkali may also be added. The amount of promoter metal will typically be in the range 0.1-5% wt on the calcined catalyst material.

The eggshell layer thickness of NiO in the catalyst is preferably in the range 0.15-1 mm for pellets with diameters ≥3 mm.

The catalysts may be used in oxidic or reduced form. Hence, the calcined product may be provided in its oxidic form and reduction of the nickel oxide, to form elemental nickel carried out in situ, i.e. in the reactor in which the catalyst is to be used, with a hydrogen-containing gas. Known reduction techniques may be used.

Alternatively, the oxidic catalyst may be reduced ex situ and then the elemental metal coated with a thin passivating layer of oxide using an oxygen containing gas. In this way the catalyst may be transported safely to the user, and the reduction time to generate the active catalyst and quantity of hydrogen used during the subsequent activation, reduced. This has clear benefits for the user. Therefore in one embodiment, the method for preparing the catalyst further comprises the steps of reducing the nickel oxide to elemental form with a hydrogen-containing gas mixture and subsequently passivating the surface of the elemental nickel with an oxygen-containing gas. Oxygen and carbon dioxide gases may be used for example as described in U.S. Pat. No. 4,090,980.

The eggshell catalysts prepared according to the invention may be used in steam reforming processes such as primary steam reforming, secondary reforming of a primary reformed gas mixture, and pre-reforming. The catalysts may also be used for methanation reactions, hydrogenation reactions and, in oxidic unreduced form, for the decomposition of hypochlorite in aqueous solutions.

In steam reforming, a hydrocarbon, typically a methane-containing gas such as natural gas or naphtha is reacted with steam and/or, where appropriate, carbon dioxide, over a catalytically active material, often comprising nickel, to produce a gas containing hydrogen and carbon oxides. The hydrogen producing reactions are:

$$CH_4 + H_2O \leftrightarrow CO + 3H_2$$

$$\text{``}CH_2\text{''} + H_2O \rightarrow CO + 2H_2$$

("CH₂" represents hydrocarbons higher than methane, for example normally gaseous hydrocarbons and normally liquid hydrocarbons boiling at up to 200° C.). The analogous reactions with carbon dioxide can be carried out separately or with the steam reaction.

$$CH_4 + CO_2 \rightarrow 2CO + 2H_2$$

$$\text{``}CH_2\text{''} + CO_2 \rightarrow 2CO + H_2$$

These reactions are strongly endothermic and the process is especially suitable when they are carried out with external heating as in tubular steam reforming. Alternatively the heat can be supplied by heating the reactants and passing steam over the catalyst in an adiabatic bed or in a hybrid process in which oxygen is a reactant, so that heat evolved in oxidation is absorbed by the endothermic reactions. The hybrid process can be applied to the product of the tubular or adiabatic process that is, in "secondary reforming", or to fresh feedstock ("catalytic partial oxidation" or "autothermal reforming"). Commonly these reactions are accompanied by the water-gas shift reaction:

$$CO + H_2O \leftrightarrow CO_2 + H_2$$

If the starting hydrocarbon is "CH₂" and the temperature is relatively low, the methanation reaction (exothermic) may also occur.

$$CO + 3H_2 \rightarrow CH_4 + H_2O$$

$$CO_2 + 4H_2 \rightarrow CH_4 + 2H_2O$$

However, the steam reforming process is operated preferably in net endothermic conditions and the hydrogen containing gas produced contains at least 30% v/v of hydrogen on a dry basis. Preferably it contains less than 30, especially less than 10, % v/v of methane on a dry basis. For the production of hydrogen-containing synthesis gas, the outlet temperature is preferably at least 600° C. to ensure low methane content. While the temperature is generally in the range 750-900° C. for making synthesis gas for ammonia or methanol production, it may be as high as 1100° C. for the production of metallurgical reducing gas, or as low as 700° C. for the production of town gas. For the hybrid process using oxygen, the temperature may be as high as 1300° C. in the hottest part of the catalyst bed.

In pre-reforming, a hydrocarbon/steam mixture is subjected to a step of adiabatic low temperature steam reforming. In such a process, the hydrocarbon/steam mixture is heated, typically to a temperature in the range 400-650° C., and then passed adiabatically through a fixed bed of a suitable particulate catalyst, usually a catalyst having a high nickel content, for example above 40% by weight. The catalysts may be simple cylinders or a multi-holed, lobed shape. Pre-reforming catalysts are typically provided in a pre-reduced and passivated form, although oxidic catalyst may also be installed. During such an adiabatic low temperature reforming step, any hydrocarbons higher than methane react with steam on the catalyst surface to give a mixture of methane, carbon oxides and hydrogen. The use of such an adiabatic reforming step, commonly termed pre-reforming, is desirable to ensure that the feed to the steam reformer contains no hydrocarbons higher than methane and also contains a significant amount of hydrogen. This is desirable in order to minimise the risk of carbon formation on the catalyst in the downstream steam reformer.

The pressure in steam reforming processes is typically in the range 1-50 bar abs. but pressures up to 120 bar abs. are proposed. An excess of steam and/or carbon dioxide is normally used, especially in the range 1.5 to 6, for example 2.5 to 5, moles of steam or carbon dioxide per gram atom of carbon in the starting hydrocarbon.

Where the catalyst is to be used for methanation, in order to remove low concentrations of CO and $CO_2$ (0.1-0.5% vol) from a hydrogen-containing gas, the hydrogen-containing gas is typically passed through a particulate fixed bed of a nickel-containing catalyst at a temperature in the range 230-450° C. and pressures up to about 50 bar abs or higher up to about 250 bar abs. Unlike steam reforming the catalyst are preferably simple cylindrical pellets without through holes, although such pellets may be used if desired. Typical pellet diameters are in the range 2.5-6 mm, with lengths in the same range. The catalysts may be provided in oxidic form or pre-reduced and passivated form.

EXAMPLES

The invention is further illustrated by reference to the following Examples.

Example 1

Preparation of a Catalyst

Calcium aluminate cement was blended with alumina trihydrate and lime to obtain a mixture with a Ca:Al ratio of 10:43. Graphite (4 wt %) was added, and the resulting mixture pelleted using a hydraulic tabletting machine to give cylinders of diameter 5.4 mm and length 5.4 mm. The pellets were subjected to water-curing and calcination to obtain a calcined shaped support. The pellets were impregnated with Ni acetate $(Ni(O_2C_2H_3)).4H_2O)$ with a concentration of 0.851M for 20 minutes at 70° C. Following this, the Ni-precursor was decomposed by calcining the impregnated supports at 290° C. for 4 hrs in air. The impregnation and calcination were repeated another two times. The Ni content of the final catalyst was 4.37% by weight.

The resulting catalyst pellets had a clear surface enrichment of Ni (as NiO) on the surface of the support with no Ni in the centre of the pellet. The eggshell layer was about 0.75 mm thick as determined by electron probe microanalysis (EPMA). EPMA was performed as follows; a polished sectional mount of the sample was made by resin mounting the pellet in epoxy resin, grinding and polishing, finishing with a silica polish. The polished face was vacuum carbon coated. Measurements were taken using a Jeol JXA-8500F electron probe microanalyzer with five wavelength dispersive spectrometers and one SDD (silicon drift diode) EDX detector. A beam current of 200 nA was used with an accelerating voltage of 20 kV. Points were taken at every 8 μm for a time of 50 ms. The EPMA image is depicted in FIG. 1.

This experiment was repeated on the same calcium aluminate support material but formed into smaller cylindrical pellets (3.3 mm×3.3 mm) using a rotary tablet press. Eggshell enrichment of the surface of the pellets with NiO was observed with impregnation at 50° C. and at 70° C. The thickness of the eggshell layer as determined by optical microscopy on sectioned pellets was about 0.40 mm at 50° C. and about 0.20 mm at 70° C. In both cases the centre of the pellets did not appear to contain any NiO. When the experiment was repeated with impregnation at 20-25° C., no surface enrichment was observed and NiO was distributed throughout the pellets.

The 3.3 mm×3.3 mm pellets impregnated at 70° C. had the following Ni contents.

| Impregnation | Ni loading (% wt) Measured by XRF (at room temperature after the pellets had been heated to 700° C.) |
| --- | --- |
| 1 | 2.3 |
| 2 | 4.3 |
| 3 | 5.3 |

The product of the $3^{rd}$ impregnation and calcination was termed catalyst 1A.

Example 2

Comparative Examples using Ni Nitrate a) Ni nitrate impregnation at 50° C. The 3.3 mm×3.3 mm calcined calcium aluminate support pellets from Example 1 were impregnated with Ni nitrate $(Ni(NO_3)_2.4H_2O)$ at a concentration of 0.851M for 20 minutes 50° C. Following this, the Ni-precursor was decomposed by calcining the impregnated supports at 290° C. for 4 hrs in air. Unlike the corresponding experiment with Ni acetate, no eggshell enrichment of the surface of the pellet with NiO was observed and NiO was distributed throughout the pellet.

b) Ni nitrate impregnation at 70° C. The 3.3 mm×3.3 mm calcined calcium aluminate support pellets from Example 1 were impregnated with Ni nitrate $(Ni(NO_3)_2.4H_2O)$ at a concentration of 3.41M for 5 minutes at 70° C. The impregnated pellets were then removed and allowed to drain for 10 minutes and dried at 110° C. for 6 hours. The dried impregnated pellets were then heated at 100° C./hour to 650° C. and then held at 650° C. for 6 hours to convert the nickel nitrate to nickel oxide. The impregnating, drying and calcining procedure was repeated on the nickel oxide containing pellets a further two times. The NiO content of this material after the final calcination was about 16.5 wt %. No eggshell surface enrichment at the surface of the pellets was observed and the NiO was distributed throughout the pellets. This comparative material was termed catalyst 2A.

Example 3

Testing

The catalysts 1A and 2A were tested in a laboratory-scale steam reformer with a reformer tube internal diameter of 1-inch. The catalysts were diluted with fused alumina chips (sieve fraction 3.35 mm-4.74 mm) and reduced using 50 vol % $H_2$ in $N_2$ at 600° C. for 2 hours. After catalyst reduction, catalyst performance was assessed at a temperature of 750° C. The feed gas was natural gas mixed with steam at a steam:carbon ratio of 3.0:1. The exit gas composition was analysed by gas chromatography. After 40 h at normal process conditions, catalyst 1A had a performance (ethane conversion) greater than 2A (64.07% conversion versus 63.20% conversion). Thus the catalyst of the present invention offers enhanced activity than the conventional catalyst prepared from Ni nitrate, despite its considerably lower Ni content.

The invention claimed is:
1. A method for preparing a catalyst comprising the steps of:
  (i) impregnating a calcined support comprising a metal aluminate with a solution comprising nickel acetate at a temperature ≥40° C. to form an impregnated support and drying the impregnated support to form a dried impregnated support, (ii) calcining the dried impregnated support, to form an eggshell catalyst comprising a nickel oxide coated support, and (iii) optionally repeating steps (i) and (ii), on the nickel oxide coated support.

2. A method according to claim 1 wherein the metal aluminate is selected from the group consisting of calcium aluminate, magnesium aluminate and nickel aluminate.

3. A method according to claim 1 wherein the metal aluminate is calcium aluminate and the calcined support is formed by shaping a calcium aluminate cement powder into a shaped support, curing the cement, and subsequently calcining the shaped support.

4. A method according to claim 3 wherein the shaped support is alkalised by impregnation with a solution of an alkali prior to calcining the shaped support.

5. A method according to claim 1 wherein the calcined support is in the form of a shaped pellet, extrudate, or granule.

6. A method according to claim 5 wherein the calcined support is in the form of a cylindrical pellet having between 1 and 12 holes extending therethrough.

7. A method according to claim 1 wherein the solution is at a temperature ≥50° C.

8. A method according to claim 1 wherein the solution has a Ni concentration in the range of 0.5-1.0M.

9. A method according to claim 1 wherein steps (i) and (ii) are performed until the nickel oxide coated support has a nickel oxide content in the range of 2 to 25% wt.

10. A method according to claim 1 wherein one or more promoter compounds are impregnated into the dried impregnated support and/or the nickel oxide coated support.

11. A method according to claim 1 wherein calcining the dried impregnated support is performed at a temperature in the range of 250-850° C.

12. A method according to claim 1, further comprising the step of reducing nickel oxide on the nickel oxide coated support to elemental form with a hydrogen-containing gas mixture.

13. A method according to claim 1 wherein the metal aluminate is calcium aluminate and the calcined support is formed by shaping a calcium aluminate cement powder, with additional alumina and/or lime, into a shaped support, curing the cement, and subsequently calcining the shaped support.

14. A method according to claim 1 wherein the solution is at a temperature ≥60° C.

15. A method according to claim 1 wherein the solution Is at a temperature ≥70° C.

* * * * *